Figure 1:
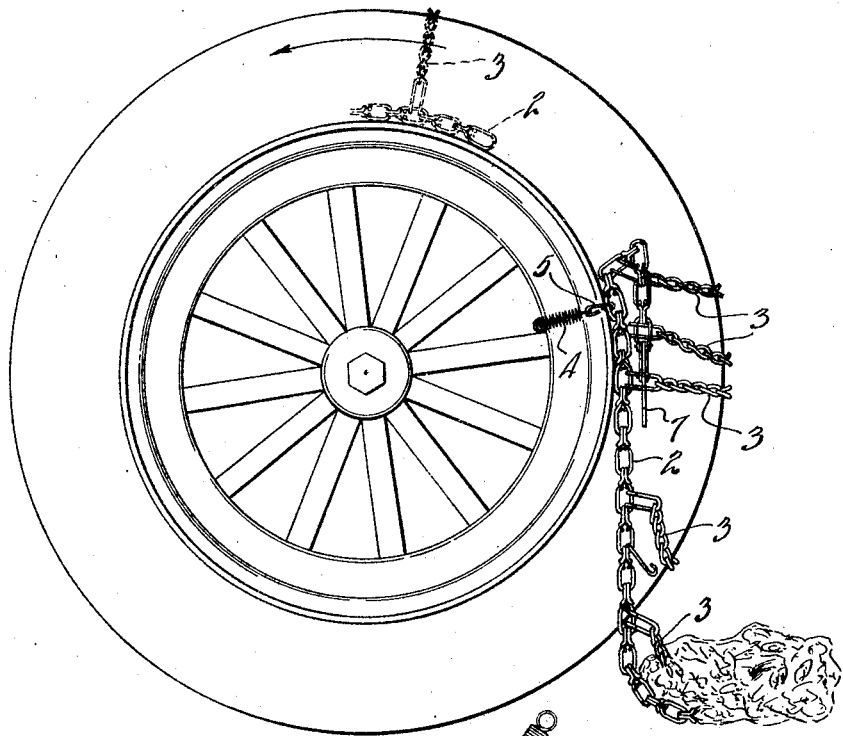

Dec. 17, 1929.  F. G. HODELL  1,740,092

TIRE CHAIN

Filed Feb. 1, 1926

Inventor
Frederick G. Hodell.
By Brockett + Hyde.
Attorneys

Patented Dec. 17, 1929

1,740,092

UNITED STATES PATENT OFFICE

FREDERICK G. HODELL, OF CLEVELAND HEIGHTS, OHIO, ASSIGNOR TO THE CHAIN PRODUCTS COMPANY, OF CLEVELAND, OHIO, A CORPORATION OF OHIO

TIRE CHAIN

Application filed February 1, 1926. Serial No. 85,220.

This invention relates to means for a method of applying non-skid chains to motor vehicle wheels, and is an improvement over the device set forth in my copending application Serial No. 715,072, filed May 22, 1924, and this application, particularly as to claim 12 hereof is a continuation in part of said copending application.

The ordinary "non-skid chain" comprises two longitudinal side or connecting chains between which are secured a number of short spaced cross chains which form the actual anti-skid members, and when applied to the tire the short chains are arranged to lie laterally across the tread of the tire and are held in this position by the longitudinal connecting chains, one on each side of the tire with ends joined to make a continuous chain extending circumferentially with the tire.

The ordinary manner of applying the non-skid chain upon the tire is to first spread it on the ground in line with the tire extending longitudinally from it roll the tire midway upon it by moving the vehicle, and then bringing up the loose ends of the chain around the tire and securing each end of each longitudinal member by suitable connecting links.

An improved method of applying the chain is made possible by means described in my co-pending application above referred to, briefly as follows: near one end of one of the side chains is secured a short flexible member carrying on its free end a hook whereby it may be secured so as to extend between the side chains. Using this member, to place the chain upon a tire it is only necessary to secure an end of the chain upon the tire by passing the flexible member around the felloe of the wheel between two spokes and secure it by hooking into the opposite link of the other side chain, whereupon the wheel may be given a round turn by moving the vehicle forward which will wrap the chain in position around the tire, after which it is only necessary to properly connect the ends of the now circumferentially extending side chains. The free end of the flexible member is then unhooked from the side chain, the member brought alongside the side chain upon which it is fixed and the free end hooked into one of the links in the side chain to secure the member in a running position.

In practice a coil spring is employed for the flexible member referred to, and it has been found that the tendency in use when applying the spring to the running position is either to strain the spring too tightly in which case the side chain is pulled together sufficiently to have an unbalanced effect upon the wheel,—or the spring is not sufficiently stretched in which case it is liable to become loose upon rapid motion of the wheel under road conditions.

It is the object of this invention to provide means whereby this resilient applying member can be placed in a running position only with a fixed tension which is predetermined as of the proper amount to avoid the contingencies above described with their corresponding undesirable results.

Figure 2:
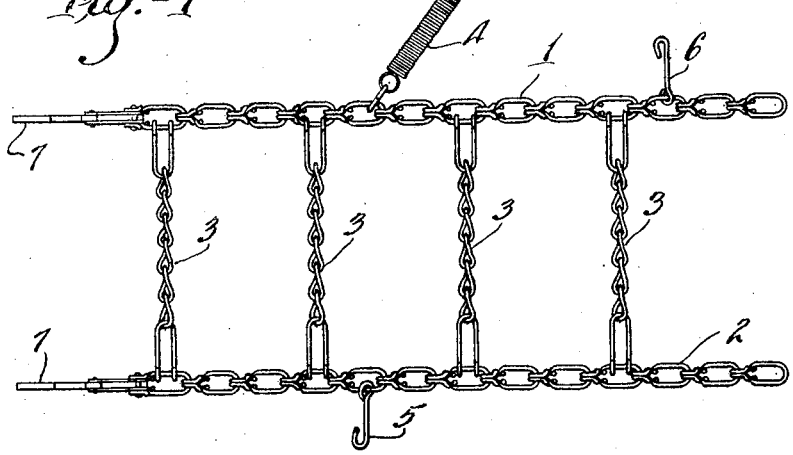

The invention will be obvious from the accompanying drawings in which Fig. 1 represents a wheel showing one end of the chain attached upon its tire in such a position that the tire may be applied to the wheel by rotation thereof and in broken lines the opposite end of the chain as applied but before securing; Fig. 2 shows a portion of the chain extended in exposition of the relative location and proportion of its several principal parts.

The anti-skid device comprises principally the two longitudinal chains 1 and 2 interconnected by the short spaced antiskid members 3, one end of each of the longitudinal chains being provided with a securing link 7 engageable with the link upon its opposite end. Upon the chain 1 near its end is fixed by means of a link, a flexible resilient member 4 comprising a simple coil spring terminating in an eye at each end. Upon the chain 2 opposite the fixed end of the member 4 is secured a hook 5 and upon the chain 1 is secured a similar hook 6; these hooks are adapted for successive engagement by the eye upon the free end of the member 4 as hereinafter to be described. The hook 6 is suitably spaced from the fixed end of the member 4 so that upon engagement with it in position on the tire the member 4 will be extended sufficiently to prevent accidental disengagement therefrom and yet its tension will not be great enough to disarrange the chain from a symmetrical position upon the tire.

The operation of the device is obvious. To apply the chain upon the tire the member 4 is passed around the wheel and attached with the hook 5 as shown in Fig. 1; the wheel is then rotated approximately 360° by advancing the vehicle, which rolling motion serves to properly position the chain upon the tire, the chain now reaching from its original end secured upon the tire, extending circumferentially about the tire, and the former free end now lying in the dotted position of Fig. 1. The links 7 are next secured in engagement with the free ends of the side chains, after which the member 4 may be disengaged from the hook 5 and engaged alongside the chain 1 with the hook 6.

By thus forming an eye upon the free end of the member 4 instead of a hook as in the prior art, it is only possible to secure the member with one of the hooks, and as the hooks are properly secured upon the chains, both secured positions of the member 4 are invariably and correctly predetermined.

Having thus described and illustrated my invention what I claim is:

1. In a tire chain comprising a pair of side chains interconnected by cross chains and adapted to be applied to a tire by wrapping thereabout, fastening means at the ends of said side chains, an extensible chain applying member permanently secured at one end upon one of said side chains near its end, an eye at the outer free end of said applying member, a hook permanently secured upon the other side chain opposite to said applying member and adapted to engage the eye of said member to secure one end of the complete tire chain with a wheel in applying the chain to the tire thereof, and a second hook permanently secured upon the side chain carrying the chain applying member and spaced therefrom and adapted to engage the eye of said member to secure the same in predetermined arrangement after said tire chain is applied on the tire.

2. A tire chain, comprising a pair of side chains, cross chains connected therebetween, end fasteners on the side chains, and a yieldable member having one of its ends permanently secured to one side chain near the end thereof and its other end provided with side chain link engaging means whereby said member may be applied through a wheel to the opposite side chain to secure one end of the chain as a whole to the tire of the wheel for assisting the assembly of the chain thereupon, and thereafter be engaged with a suitable link of the side chain to which it is secured, for creating tension in the chain and thereby providing a chain adjuster under running condition.

In testimony whereof I hereby affix my signature.

FREDERICK G. HODELL.

CERTIFICATE OF CORRECTION.

Patent No. 1,740,092.             Granted December 17, 1929, to

FREDERICK G. HODELL.

It is hereby certified that error appears in the printed specification of the above numbered patent requiring correction as follows: Page 1, line 5, for "claim 12" read "claim 2"; and that the said Letters Patent should be read with this correction therein that the same may conform to the record of the case in the Patent Office.

Signed and sealed this 18th day of February, A. D. 1930.

(Seal)

M. J. Moore,
Acting Commissioner of Patents.